May 6, 1930.  F. J. BECHERT  1,757,700
SPRING END CONNECTION
Filed June 15, 1928

INVENTOR.
Fred J. Bechert
BY
ATTORNEYS.

Patented May 6, 1930

REISSUED 1,757,700

UNITED STATES PATENT OFFICE

FRED J. BECHERT, OF STAMFORD, CONNECTICUT, ASSIGNOR TO THE FAFNIR BEARING COMPANY, OF NEW BRITAIN, CONNECTICUT, A CORPORATION OF CONNECTICUT

SPRING-END CONNECTION

Application filed June 15, 1928. Serial No. 285,579.

My invention relates to a spring end connection and particularly, though not exclusively, to a spring shackle construction for motor vehicles.

It is an object of the invention to provide a spring end connection having antifriction bearing means for sustaining the normal loads between the frame and spring, together with means for sustaining side or what may be termed end thrust loads between those members.

It is a more specific object to provide a spring end connection employing what may be termed radial load bearing antifriction bearing means for connecting a spring and frame together with antifriction bearing means for sustaining side or end thrust loads between the frame and spring.

Briefly stated, in a preferred form shackle, I provide bearing means to be secured to a spring and a frame. Connecting shackle links serve to connect the spring and frame, and antifriction bearing members are interposed between the shackle links and the bearing members carried by the spring and frame. To take up side, or what may be termed end thrust loads of the spring and frame, I employ means such as a ball or roller bearing device so that when assembled one set of antifriction bearing means may take the normal or what may be termed radial thrust loads between the spring and frame, and another means which may be an antifriction bearing may take up the side or what may be termed axial or end thrusts between the spring and frame.

In the drawings which show, for illustrative purposes only, preferred forms of the invention—

Figure 1:
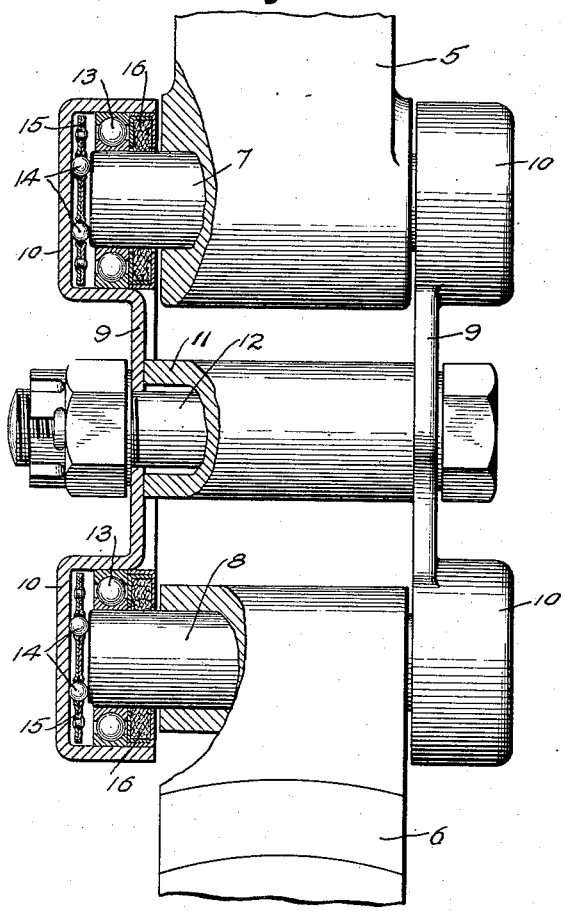
Fig. 1 is a fragmentary end view of a spring and frame connected by shackles partly broken away for the purpose of illustrating interior construction.

I have illustrated the invention in connection with shackle links connecting the ends of an automobile frame and spring. It is to be observed that the invention is not confined to connecting the end of the frame and spring, but may be employed on what is usually the inner end of a spring and frame. The invention is also applicable to the so called hinge end connection between a spring and frame as well as to the shackle connection, as illustrated.

In said drawings, 5 indicates a part of a frame while 6 indicates a part of a spring to be connected to said frame. Bearing means such as a pin 7 may be secured to the frame 6 by any suitable means or may be a drive fit in an eye of the frame. A similar bearing means such as the pin 8 may be similarly secured in an eye in the spring 6. Shackle links 9—9 may be employed for securing the spring and frame together. In the form shown these shackle links are provided with depressions or cups 10—10 at the ends into which the ends of the pins 7—8 may project. The shackle links 9—9 may be definitely spaced apart by any suitable means such as the thimble 11 and secured in such definitely spaced relation as by means of a through-bolt 12.

The normal or what I may term radial loads between the frame and spring are taken by means of antifriction bearing members such as the balls 13—13. In the form shown these balls are part of radial unit handling bearings, the inner rings of which are on the ends of the pins 7 and 8. I do not wish to be confined to a unit handling bearing, since the invention is of broader application, and any means of providing an antifriction bearing connection will suffice. The antifriction bearing members such as 13 may be arranged to sustain only the normal or what I term the radial loads between the spring and frame. Unit handling bearings as rigidly secured to the pins such as 7—8 and the shackle plates would sustain both radial and thrust loads, but it is exceedingly difficult to secure the bearing rings so as to properly take the end thrusts.

For the purpose of taking the side thrusts or what I may term end thrust loads, I preferably employ one or more antifriction bearings such as balls 14 which may engage any part fixed to the frame 5 and spring 6, for example, the pins 7 and 8. These thrust bearing antifriction bearing members may be held in suitable cages as 15. The ends of the cups may be closed by dust rings 16 as is usual.

Figure 2:
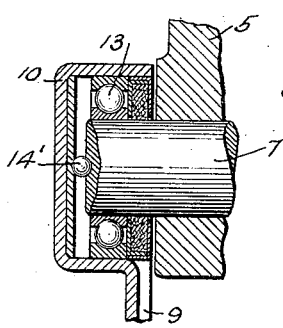
Fig. 2 is a fragmentary, sectional view of a slightly modified form.

In the modification shown in Fig. 2, I employ a single thrust member such as a ball 14' which may engage the pin 7 centrally so as to take the end thrusts or side thrusts between the spring and frame.

When my improved spring end connection such as the shackle construction illustrated is in use, the antifriction bearing members such as balls 13 sustain the spring and frame and take the normal or what I term radial loads, and any side or what I term axial or end thrusts are taken by antifriction bearing members such as the balls 14—14 or the single thrust member such as the ball 14'.

While the invention has been described in considerable detail and a single application, that is, to a shackle construction has been illustrated, I do not wish to be strictly limited to the constructions herein disclosed, since the invention may be otherwise embodied, and changes may be made within the scope of the invention as defined in the appended claims.

I claim:

1. In a spring end connection, a bearing member to be secured to a spring, a second bearing member to be secured to a frame, a pair of shackle links having bearing raceways, antifriction bearing members interposed between said shackle links and said bearing members on said spring and frame, and means between said shackle links and said bearing members on the spring and frame for resisting end thrust of said bearing means on said spring and frame.

2. In a spring end connection, bearing pins to be secured to a spring and a frame, respectively, shackle links for connecting said spring and frame, antifriction bearing members interposed between said bearing pins and said shackle links, and means engaging said bearing pins endwise for resisting thrust of said bearing pins.

3. In a spring end connection, bearing pins to be secured to a spring and frame, shackle links to secure said spring and frame together, antifriction bearing members interposed between said bearing pins and shackle plates, and antifriction bearing means engaging said pins endwise for resisting thrust of said pins.

4. In a spring end connection, bearing means to be secured to a spring and a frame, shackle links to hold said spring and frame together, antifriction bearing members interposed between said means and said shackle links for sustaining said means radially, and an antifriction bearing member for sustaining said means axially.

5. In a spring end connection, shackle links for securing a spring and frame together, antifriction bearing means for transmitting radial loads between said shackle links and said spring and frame, and antifriction means for sustaining end thrust loads between said shackle links and said spring and frame.

6. In a spring end connection, means including antifriction bearing members for connecting a spring and frame together, and sustaining normal loads between said spring and frame, and antifriction bearing means for sustaining end thrust loads between said spring and frame.

7. In a spring end connection, shackle means for connecting a spring and frame, and antifriction bearing members for sustaining end thrust loads only between said spring and frame.

8. In a spring end connection, a spring, a frame, means on one of said members and extended over the other of said members, antifriction bearings for sustaining normal loads between said means and the said other of said members, and antifriction bearing means for sustaining end thrust loads between said spring and frame.

FRED J. BECHERT.